US008692668B2

(12) United States Patent
Ramesh

(10) Patent No.: US 8,692,668 B2
(45) Date of Patent: Apr. 8, 2014

(54) NETWORK BASED SYSTEM FOR PREDICTING LANDSLIDES AND PROVIDING EARLY WARNINGS

(75) Inventor: Maneesha V. Ramesh, Kollam (IN)

(73) Assignee: Amrita Vishwa Vidyapeetham (IN)

( * ) Notice: Subject to any disclaimer, the term of this patent is extended or adjusted under 35 U.S.C. 154(b) by 269 days.

(21) Appl. No.: 13/168,357

(22) Filed: Jun. 24, 2011

(65) Prior Publication Data
US 2012/0206258 A1 Aug. 16, 2012

Related U.S. Application Data

(60) Provisional application No. 61/441,884, filed on Feb. 11, 2011.

(51) Int. Cl.
*G08B 1/08* (2006.01)
*G08B 21/00* (2006.01)
*G08B 9/00* (2006.01)
*G01V 3/00* (2006.01)
*G01B 5/00* (2006.01)
*E21B 47/00* (2012.01)

(52) U.S. Cl.
USPC .......... 340/539.22; 340/602; 340/286.02; 340/853.1; 340/539.1; 73/784; 166/250.01

(58) Field of Classification Search
USPC ......... 340/539.22, 539.1, 602, 286.02, 853.1, 340/856.3, 690, 9; 166/250.01; 73/784
See application file for complete search history.

(56) References Cited

U.S. PATENT DOCUMENTS

| | | | | |
|---|---|---|---|---|
| 5,181,797 A | * | 1/1993 | Circeo et al. | 405/131 |
| 5,279,502 A | * | 1/1994 | Goughnour | 405/237 |
| 5,675,088 A | * | 10/1997 | Serata | 73/784 |
| 5,934,373 A | * | 8/1999 | Warpinski et al. | 166/250.1 |
| 6,329,904 B1 | * | 12/2001 | Lamb | 340/286.02 |
| 6,530,284 B1 | * | 3/2003 | Tambo et al. | 73/784 |
| 7,200,292 B2 | * | 4/2007 | Shang et al. | 385/13 |
| 2004/0075552 A1 | * | 4/2004 | Rao et al. | 340/539.1 |
| 2009/0099701 A1 | * | 4/2009 | Li et al. | 700/284 |

OTHER PUBLICATIONS

K. Cole; G. M. Davis, Instability Planning and Management: Seeking Sustainable Solutions to Ground, Jul. 2002, p. 466.*
K. Cole; G. M. Davis, Instability Planning and Management: Seeking Sustainable Solutions to Ground, Jul. 2002, p. 466 http://books.google.com/books?id=2NV6DM1xL7IC&lpg=PA478&ots=REqFb8Krv2&dq=instability%20planning%20and%20management%20cole%20%26%20davis%20landslides&pg=PA478#v=onepage&q=instability%20planning%20and%20management%20cole%20&%20davi.*

* cited by examiner

*Primary Examiner* — Jennifer Mehmood
*Assistant Examiner* — Omar Casillashernande
(74) *Attorney, Agent, or Firm* — Donald R. Boys; Central Coast Patent Agency, Inc.

(57) ABSTRACT

A wireless node for monitoring landslide conditions has at least one tubular probe body deployed in a borehole in a landslide prone area and anchored to rock below soil, multiple sensors carried by and deployed within and or outside of the tubular probe body for measuring geologic motion, hydrologic saturation and pressure at three or more levels of soil above the rock, a data acquisition board in communication with the sensors carried by and or deployed within or outside of the probe body, and a wireless transceiver in communication with the data acquisition board and accessible to a local area wireless network (LAWN). Geologic and hydrologic data of layers of soil above the anchor rock is from the sensors deployed on or near the probe body, the data qualified against threshold readings to provide graduating levels of alerts culminating in a warning of a landslide.

20 Claims, 5 Drawing Sheets

NETWORK BASED SYSTEM FOR PREDICTING LANDSLIDES AND PROVIDING EARLY WARNINGS

CROSS-REFERENCE TO RELATED APPLICATIONS

The present invention claims priority to a U.S. provisional patent application Ser. No. 61/441,884 filed on Feb. 11, 2011, disclosure of which is incorporated herein in its entirety at least by reference.

BACKGROUND OF THE INVENTION

1. Field of the Invention

The present invention is in the field of disaster preparedness and pertains particularly to methods and apparatus for monitoring landslide prone areas and predicting impending landslides before they occur.

2. Discussion of the State of the Art

In the field of disaster preparedness relative to landslides and avalanches there are conventions and methods for assessing dangerous conditions and providing warnings if possible to potentially affected communities of impending landslides or similar events that involve displacement of earth or in the case of avalanche, snow. A challenge with monitoring landslide conditions is that more often singular and isolated sensors are checked periodically along with visual presence assessments to determine the potential risks of a landslide and there is not enough of or the right kind of sensor data to enable an accurate and timely prediction of an impending event.

Alerts and warnings associated with potential landslides are often issued when rainfall amounts are high but no other significant data is collected and analyzed prior to and during a landslide event that would enable logical prediction of the course and intensity of a potential slide. Typically once rainfall amounts each a certain level, a generic landslide warning may be issued based on past events or educated guessing as to the timing and severity of the event.

Therefore, what is clearly needed is a system and methods for deploying and monitoring a variety of strategically placed sensors accessible through an alert-based monitoring and notification network that is regionally deployable and accessible to those potentially affected by the monitored local events.

SUMMARY OF THE INVENTION

The problem stated above is that it is desirable to be able to predict a landslide accurately and in time for evacuations, but at the time of this writing there are no good standard methods for monitoring an area suspected of landside propensity determining exactly when a slide would occur after rain gauges are saturated. The inventors therefore considered functional components of sensor deployment and data reporting network, looking for elements that exhibit interoperability that could potentially be harnessed to provide early warning data of an impending landslide, but in a manner that would be much more accurate and that would not create confusion or undue expense to implement.

Every early warning system is judged by accuracy and reliability, one by-product of which is an abundance of community members who are notified well ahead of a potential disaster like a landslide, for example. Most such warning systems employ sensors and network-connected facilities to conduct the sensed data to a more realistic terminal for analysis by professionals, and sensors, network components, and data servers are typically a part of such apparatus.

The present inventor realized in an inventive moment that if, at the beginning of monitoring, an array of sensors could be strategically deployed powered on to monitor conditions in a graduated manner, significantly earlier prediction of an impending and imminent landslide might result. The inventor therefore constructed a network-based monitoring system for predicting landslides and propagating alerts and warnings thereof to affected community members that allowed significantly more time for evacuation, but improved the accuracy of the alerts and warnings associated with a monitored event. A significant reduction in loss of life and injuries results, with no increase in confusion or work created.

Accordingly, in an embodiment of the present invention, a wireless node for predicting landslides is provided and includes at least one tubular probe body deployed in a borehole in a landslide prone area and anchored to rock below soil, multiple sensors carried by and deployed within and or outside of the tubular probe body for measuring geologic motion and hydrologic saturation and pressure at three or more distinct levels of soil above the rock, a power source, a data acquisition board in communication with the sensors carried by and or deployed within or outside of the probe body, and a wireless transceiver in communication with the data acquisition board and accessible to a local area wireless network (LAWN), which is in turn accessible to a wide area wireless network (WAWN).

Geologic and hydrologic data of at least three separate layers of soil above the anchor rock is collected in real time from the sensors deployed on or near the probe body, the data qualified against threshold readings in three or more stages to provide graduating levels of alerts culminating in a warning of an impending landslide.

In one embodiment, the multiple sensors include but are not limited to piezometers, moisture sensors, strain gauges, and tilt meters. In one embodiment, individual ones of the multiple sensors are placed in the impermeable soil layers at, above and below the normal water table. In one embodiment the wireless node further includes access to data from at least one rain gauge. In one embodiment, the wireless node further includes access to data from at least one geophone. In one embodiment, the borehole is back-filled with grout after one or more probes are deployed within.

In one embodiment, the rain gauge or gauges have a threshold of an amount of rain associated therewith and breaching thereof causes the sensors deployed by the tubular probe body to begin sensing data at a first informal level of alert. In one embodiment, there is more than one tubular probe body per borehole and wherein the tubular probe bodies include bodies of differing diameters that deploy different sensor types. In one embodiment, the wireless node further includes a solar panel for re-charging batteries.

In one aspect of the present invention, a method is provided for alerting a community to a landslide over a network, including a wireless node connected to the network incorporating a wireless transceiver, a power source, at least one tubular probe body deploying multiple sensors in a pre-prepared borehole for measuring geologic motion and hydrologic saturation. The method includes the steps (a) monitoring moisture readings during heavy rainfall until a saturation threshold is reached, (b) issuing a level one alert to a web server connected to the network, the alert data propagated from the server to a research group monitoring the rainfall event, (c) monitoring pore water pressure values until a saturation threshold is reached, (d) issuing a level two alert to the web server, the alert data combined with other information and distributed to the affected community and government officials as a landslide watch, (e) monitoring for movement of soil during the high pore pressure event until soil movement is detected, and (f) issuing a level three alert to the web server, the alert data combined with other information and distributed to the affected community and government officials as a landslide in progress.

In one aspect of the method, the multiple sensors include but are not limited to piezometers, moisture sensors, geophones, strain gauges, and tilt meters. In a preferred aspect, wherein individual ones of the multiple sensors are placed in the impermeable soil layers at, above, and below the normal water table. In one aspect of the method, there is more than one tubular probe body per borehole and wherein the tubular probe bodies include bodies of differing diameters that deploy different sensor types. In all aspects of the method, in steps (d) and (f), alerts may be propagated using email, short message services (SMS), television broadcast, radio broadcast, and web page notifications.

In one aspect of the method, in step (a) only rain gauges and geophones are monitored. In this aspect, in step (c), rain gauges, geophones, moisture sensors, and piezometers are monitored with readings performed at a higher frequency. In this aspect, in step (e), rain gauges, geophones, moisture sensors, piezometers, tilt meters, and strain gauges are monitored with readings taken at a higher frequency.

In a preferred aspect of the method, the network includes a local wireless fidelity (WiFi) network with access to a local area wireless network (LAWN) with access to a wide area wireless network (WAWN). In one aspect, the tilt meters are installed in soil and in the center of one or more of the tubular probe bodies. In another aspect, the tilt meter installed in the center of a tubular probe body measures an amount of bend in the tubing forming the body.

BRIEF DESCRIPTION OF THE DRAWING FIGURES

DETAILED DESCRIPTION

The inventors provide a wireless node and sensor array connected to an alerting network for monitoring a landslide-prone area for signs of an impending landslide, and for alerting affected communities of an impending landslide event. The present invention is described in enabling detail using the following examples, which may describe more than one relevant embodiment falling within the scope of the present invention.

Figure 1:
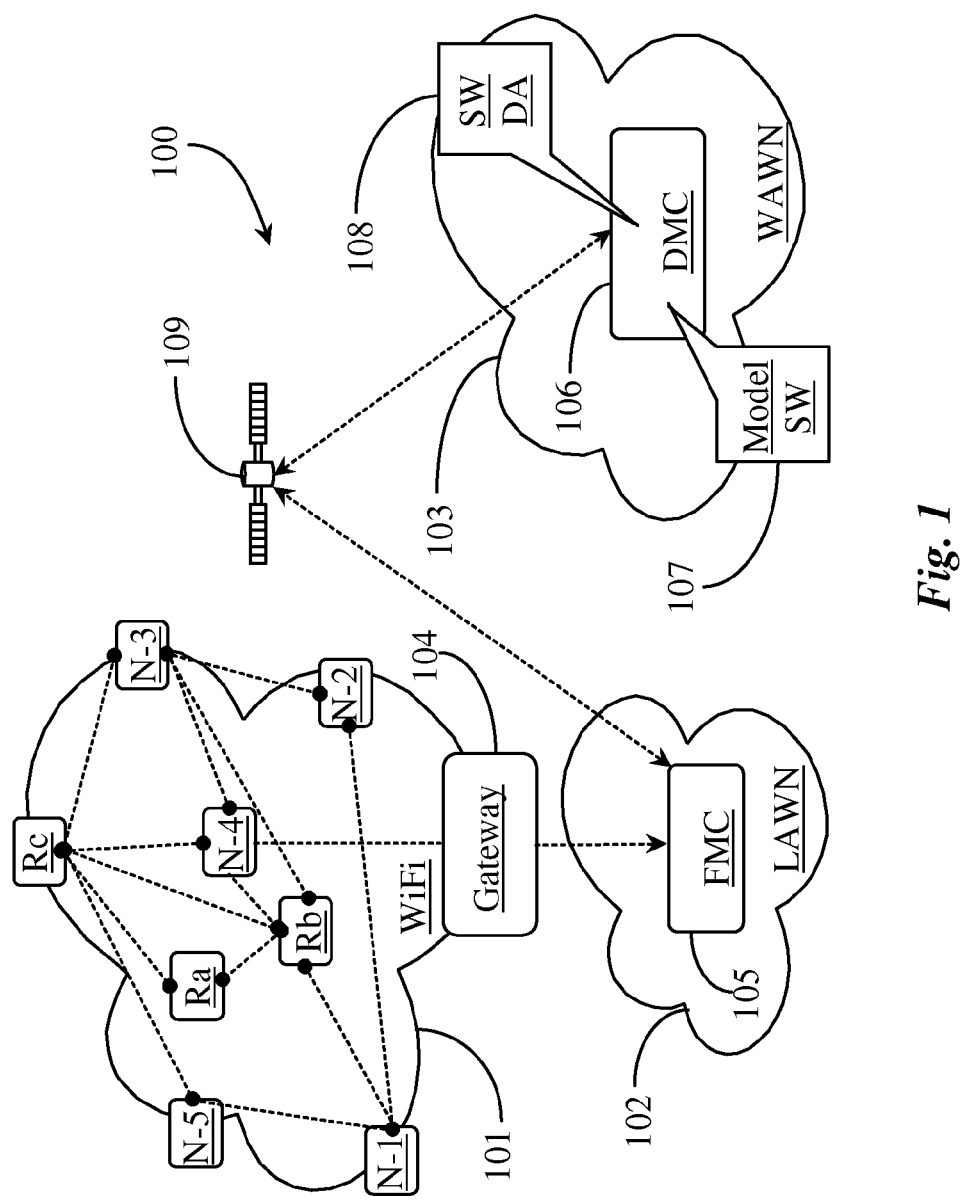
FIG. 1 is an architectural diagram illustrating a communications network supporting landslide event monitoring according to an embodiment of the present invention.

FIG. 1 is an architectural diagram illustrating a communications network 100 supporting landslide event monitoring and event notification according to an embodiment of the present invention. Communications network 100 includes a wireless fidelity network (WiFi) 101 accessible through a wireless gateway 104. Network 101 is termed a field network and may be one of several such networks deployed in one or more areas of ground that may be prone to landslide activity. Typically speaking a landslide prone area will comprise a sloping grade that may be come unstable during heavy rain.

Field network 101 may also be termed a probe network in this specification because of deployment of deep earth probes (not illustrated) that carry various geologic and hydrologic sensors that report rain saturation and earth movements during monitoring of a landslide event. In this embodiment there are three rain gauges deployed in the area covered by field network 101. These are rain gauges Ra, Rb, and Rc. In a typical implementation, a rain gauge is deployed near the top or crown area of a slope that is prone to landslide activity. Another rain gauge is typically placed near the middle of the slope and the third gauge near the foot or toe of the slope. In this embodiment, rain gauges are the first line of sensors used to determine when a slope should be monitored and at what frequency sensor reporting is commenced.

In this embodiment, several wireless nodes, N1-N5 are deployed throughput the suspect area within communication range of the wireless network. In this example field network 101 is a WiFi network, however, other wireless network technologies might be used to create a local wireless network. A wireless node is the reporting node for at least one deep earth probe (not illustrated) deployed adjacent to or at least in close proximity to the host wireless node for efficiency in sensor reporting. Each wireless node may send and receive data from other sister nodes in the network and each of the nodes has access to information from rain gauges Ra, Rb, and Rc. In one embodiment, each rain gauge includes a wireless transceiver for reporting rainfall amounts to the other wireless nodes connected to deep earth probes used to deploy the various sensors. Each wireless node includes a transceiver and can send data out to an external network as well as receiving data such as commands from the external network. The hardware platforms incorporated include Crossbow MicaZ and the newly developed WINSOC wireless sensor nodes to capture the prevailing geological and hydrological parameters.

Gateway 104 may support several field or "probe" networks. Gateway 104 is connected to a local area wireless network (LAWN) 102. A WiFi network (not specifically illustrated) is established between gateway 104 and a field management center (FMC) 105 to support LAWN 102. A network controller (not illustrated) is deployed between probe network gateway 104 and FMC facility 105. The network controller supports WiFi protocols such as 802.11b and 802.11g as well as transmission control protocol (TCP) data packets and user data gram protocol (UDP) data packets. In a preferred embodiment, FMC is automated. However, there may be one or more individuals located at the site that perform routine duties.

FMC 105 is established some 500 meters or so from the field network 101. FMC 105 includes, among other things, a data acquisition (DAQ) controller that receives data from rain gauges and specified geo-sensors that are deployed in the field network 101. FMC 105 also includes a database (DB) server and a field network controller. The field network controller supports network protocols like broadband and general packet radio service (GPRS). The field network controller supports a very small aperture terminal (VSAT) ground terminal that connects network 102 via a satellite 109 to a wide area wireless network (WAWN). It is noted herein that the described network components that are not specifically illustrated in this example are well known network components that are available to the inventors.

WAWN 103 may be any type of wireless digital network including a municipal area network (MAN) or any wireless Internet segment. WAWN 103 provides wide area connectivity, and it consists of satellite network, a global system for mobile/general packet radio service (GSM/GPRS) network, and broadband network. WAWN 103 includes a data management center (DMC) 106. DMC 106 includes among other things, a central management gateway through which data are propagated, a database, and web server for serving web-based alerts. Various alert services may be provided such as alerts via email, short message services (SMS), and multimedia message services (MMS). In one embodiment, telephony-based alert services may also be provided such as a reverse 911 calling center or dispatch services. It is noted herein that components within DMD 106 that are not illustrated in this example are well known in the art and available to the inventor.

DMC 106 includes a landslide modeling software application 107 and raw data analysis software 108. Landslide modeling software 107 enables knowledge workers monitoring local rain events to determine the proper thresholds of data coming into the center from the sensors deployed in the fields. Changing certain parameters of the landslide model 107 can result in the adjustment of certain thresholds relative to sensor data that when breached would result in a notification, alert, or warning of an impending landslide. Of course the goal of the deployment network 101 is to enable more time for affected communities to evacuate from an area that will be devastated by a slide. Data analysis software 108 is provided to analyze incoming sensor data in real time and to determine when the data indicates certain stages of alert.

Under extreme conditions, WAWN 103 adapts if part of the available network is compromised. For example, if the VSAT network is not available, the broadband or GPRS connectivity supported by FMC 105 is used for uploading the sensor data in real time directly to a web page with minimum delay and thus provides fault tolerance. The real time data and the results of the data analysis may be streamed over the Internet in real time. Alert services such as E-Mail, SMS and MMS are implemented to alert about the probability of landslides, status of the network, and for monitoring the system components.

The network architecture illustrated in this example is scalable. Any number of wireless nodes and additional landslide deployment fields can be incorporated via a Wi-Fi network to the same FMC (105). This gives scientists and emergency notification personnel the capability of monitoring very large areas of landslide concern. Moreover, the spatio-temporal analysis relative to a larger region as opposed to a local pocket provides an even better understanding of events that trigger landslides.

Network 100 delivers data continuously from a set of deep earth probes deploying various sensors in what may be a remote mountainous area to a data management, analysis, and visualization center, which might be hundreds of miles distant from the monitored area. Therefore, a very lightweight management framework (LMF) is provided that incorporates different heterogeneous networks such as 802.15.4, 802.11b/g, VSAT, GPRS, GSM, Internet, and other proprietary wireless sensor network and hardware architectures. It can handle various network failures, data corruption, packet loss, and congestion problems. More detail regarding network components such as data handlers, data caches, and so forth is illustrated in the provisional patent application that this specification has priority to. These include various power consumption and data handling optimizations to make reporting and alerting more efficient than would otherwise be the case.

Figure 2:
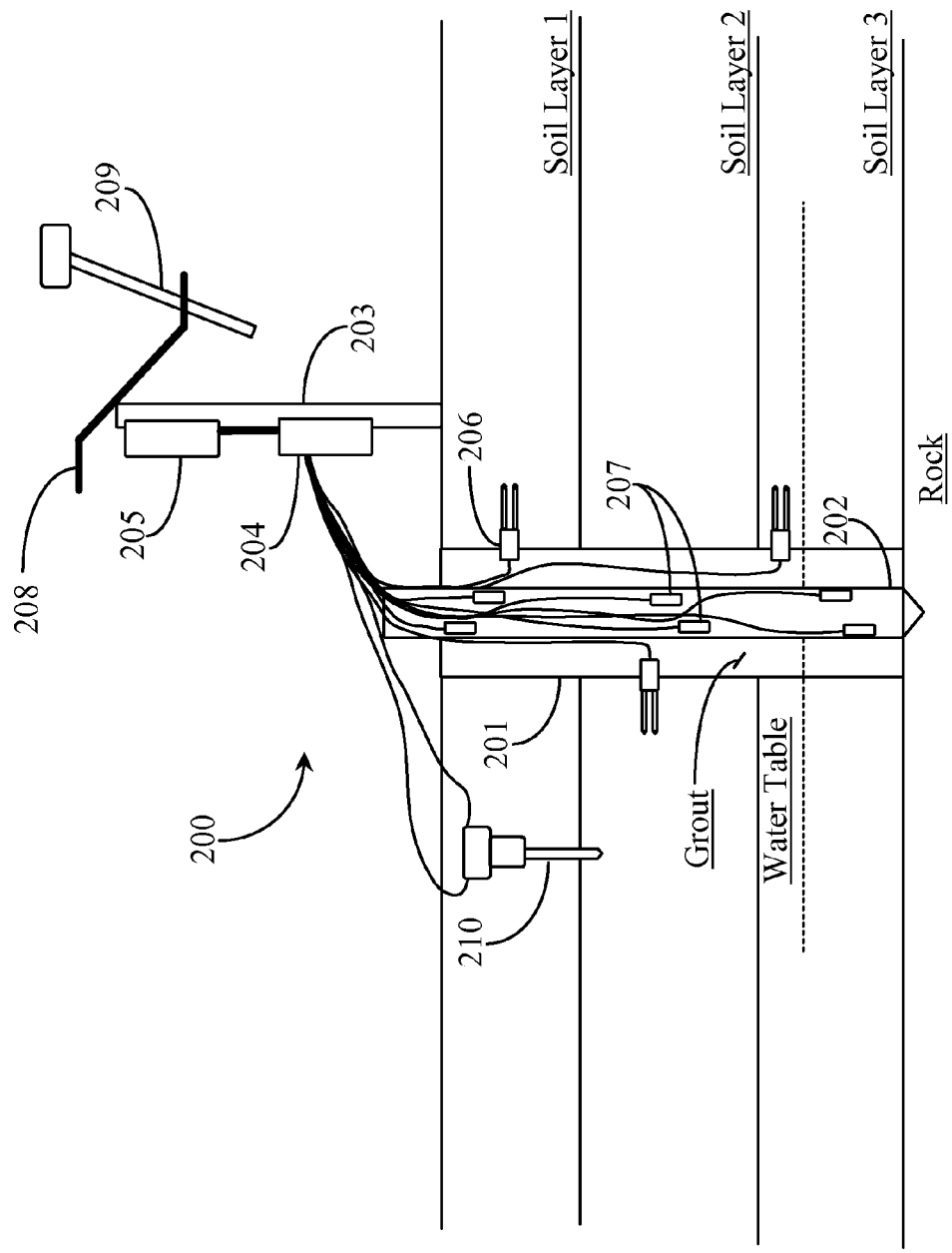
FIG. 2 is an elevation view of a wireless node with hydrologic and geologic sensor deployment in a landslide prone area.

FIG. 2 is an elevation view of a wireless node 200 with hydrologic and geologic sensor deployment in a landslide prone area. In this example, the term wireless node shall incorporate all of the connected components and sensors including the data acquisition board, power source, and wireless transceiver. Wireless node 200 includes one or a set of deep earth probes (DEP) such as a DEP 201 that is placed in a prepared borehole 201 that is drilled into the earth through at least three soil layers. DEP 202 comprises a tubular probe body that may be of different length and diameter dependant on the type of sensors that will be attached to it or otherwise deployed by it.

Borehole 201 may include one or more than one deep earth probe that has sensors attached thereto or deployed therein. In this example, probe 202 is anchored in bedrock below three different successive layers of soil (for illustration purposes). The properties of each of these layers are different, so it is important to collect hydrologic and geologic data from each of the layers. These are a soil layer 1, a soil layer 2, and a soil layer 3. In a preferred embodiment, criteria for drilling a deep earth probe borehole is that it be drilled through at least three disparate soil layers and culminate at the bedrock layer or other layer of rock. Using these criteria, the length of the borehole may vary greatly.

In actual practice in the deployment field, the borehole is continued until bedrock is determined. In specific situations when the bedrock is too deep under the surface of the earth or about 100 meters, specific criteria determined the point that drilling could be stopped. The termination of the borehole occurred after finding (a) More than three separate impermeable layers of soil; (b) Weathered rock for more than 5 meters; or (c) Water table and weathered rock for more than 5 meters.

In this example, the water table is illustrated as a broken line just blow soil layer 2. An impermeable soil layer has the potential to hold a perched water table. Such as water table may become overwhelmed during a heavy rain event and may contribute to a landslide. Therefore, the water table plays an important role in landslide monitoring as does saturation levels of the different soil layers. In this example, probe 202 has multiple strain gauges 207 attached thereon facing the expected direction of soil movement should it occur during a landslide. A strain gauge measures pressure against itself caused by abutment of adjacent earth. It is a geologic sensor that may detect minute movement of soil. In this example, strain gauges are strategically located near the top, middle, and near the nose of deep earth probe 202. The soil layer movements are generally initiated above the impermeable layers of soil. The strain gauge sensors are deployed in the impermeable layers and the layer above the impermeable layer to measure the strain variation experienced in the impermeable layer and the layer above it.

In one embodiment, multiple strain gauges 207 are deployed in each of the soil layers to capture the soil movement in x, y directions. According to the risk level of the impermeable layer, the location of the sensor placement, and the prospective landslide initiation and direction of flow, the number of sensors and the direction of the deployment is determined using an algorithmic formula. Strain gauges are connected by sensor wire to a wireless transceiver 204 equipped with a data acquisition board (DAQ) board 204 that is connected by cable to a hybrid battery-charging unit 205. In this example, wireless transceiver 204 and charging unit 205 are mounted on a post 203 adjacent to the borehole.

A geophone sensor 210 is illustrated in this example in soil layers 1 and 2. A geophone measures earth movement in the soil layer and is a geologic sensor. Geophone 210 is connected to wireless transceiver 204 by sensor wiring. There may be several geophones connected to transceiver 204 without departing from the spirit and scope of the present invention. In a preferred embodiment hydrologic sensors are the first sensors that are monitored for data during a rain event that is strong enough to warrant landslide monitoring.

In this example, several dielectric moisture sensors 206 are deployed at various levels in the walls of borehole 201. A dielectric moisture sensor measures the amount of moisture in the soil layer where it resides. It is important to collect data from each successive soil layers above the water table. A grout mix (Grout) is prepared and packed into the borehole to compensate for soil removed from the hole. The grout mix is used to achieve the same soil strength and compactness inside the borehole that the normal soil would have. This mix is prepared by using a predetermined ratio of water, bentonite, and cement. In optional configurations, wireless node 200 may include a solar panel 208 for additional charging power. Also optional is an external wireless antennae 209 for improving wireless signal.

Figure 3:
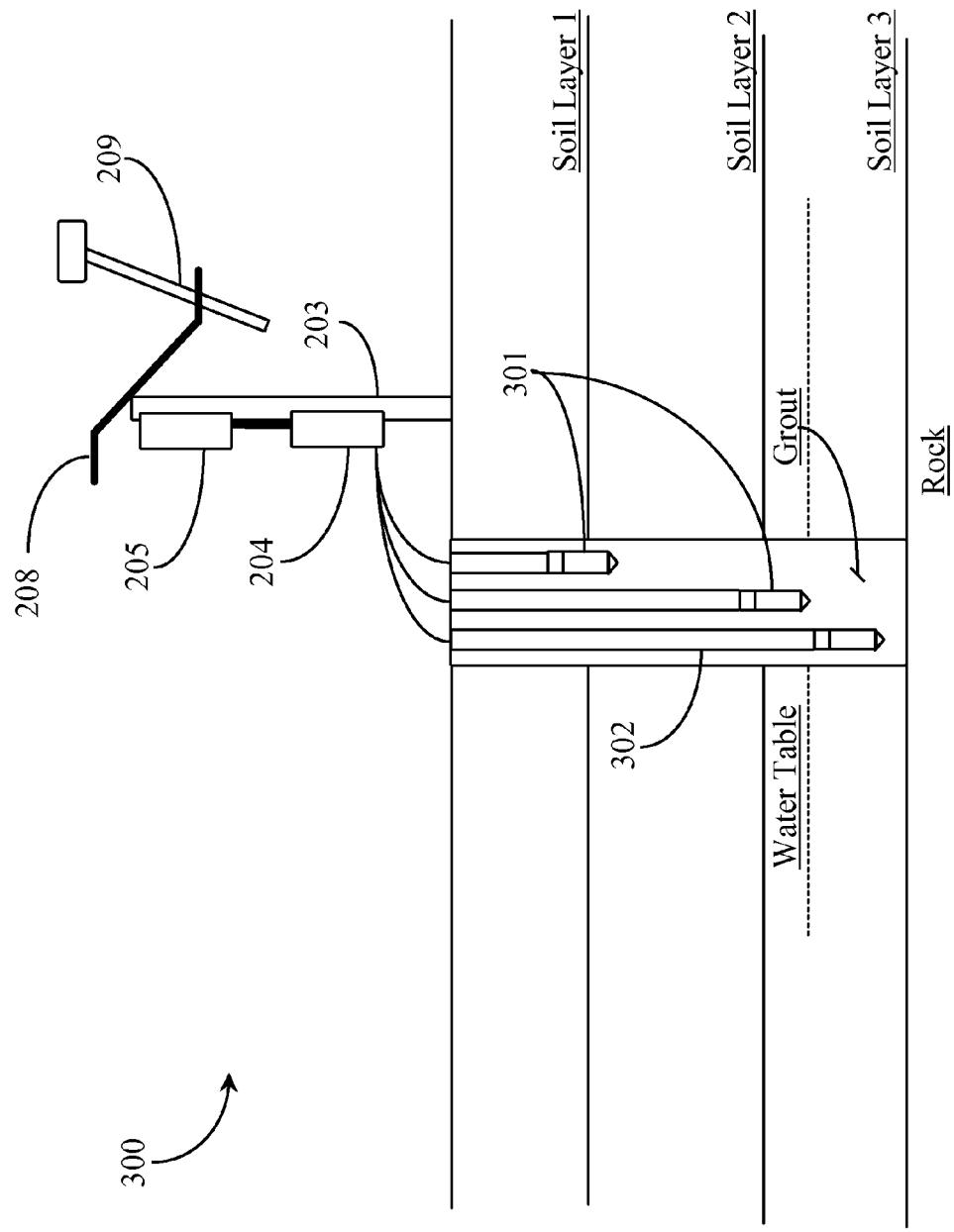
FIG. 3 is an elevation view of a wireless node with alternative hydrologic sensor deployment in a landslide prone area.

FIG. 3 is an elevation view of a wireless node 300 with alternative hydrologic sensor deployment in a landslide prone area. Wireless node 300 includes some of the same components described previously such as wireless transceiver 204, charging unit 205, solar panel 208 and antennae 209 all mounted on post 203. In this particular embodiment, there are three deep earth probes 302 inserted into the borehole at different soil layer depths. These particular probes have probe bodies that are smaller in diameter than those carrying other sensor types. These DEPs 302 are adapted to carry piezometers 301. A piezometer is a hydrologic moisture sensor adapted to test water pressure (pore pressure) at various soil levels within the borehole. Each piezometer is attached to a separate deep earth probe 302 and is positioned by the probe in the borehole at a particular soil layer. In this example the piezometers are in a nested configuration with one at the boundary of soil layer 1 and soil layer 2; another at the boundary of soil layer 2 and soil layer 3 just above the water table; and another below the water table in soil layer 3.

The piezometers will measure the water pressure (pore pressure) within the borehole at various layers of soil. Nested piezometers are placed below and above the water table to monitor the variation of pressure levels according to the climatic condition. In addition, they are deployed in the impermeable layers of the soil because water tables will accumulate above the impermeable soil layers leading to slope instability. In practice, the hydrologic gauges that can be deployed with a deep earth probe and or wireless node are rain gauges, dielectric moisture sensors and piezometers. These are the first line sensors that are monitored to determine if geologic movement sensors need to be powered on and monitored for data. As in other embodiments, the boreholes are backfilled with a grout composition to fill space not occupied by a DEP so soil properties, like compactness for example, are mimicked by the grout mixture.

Figure 4:
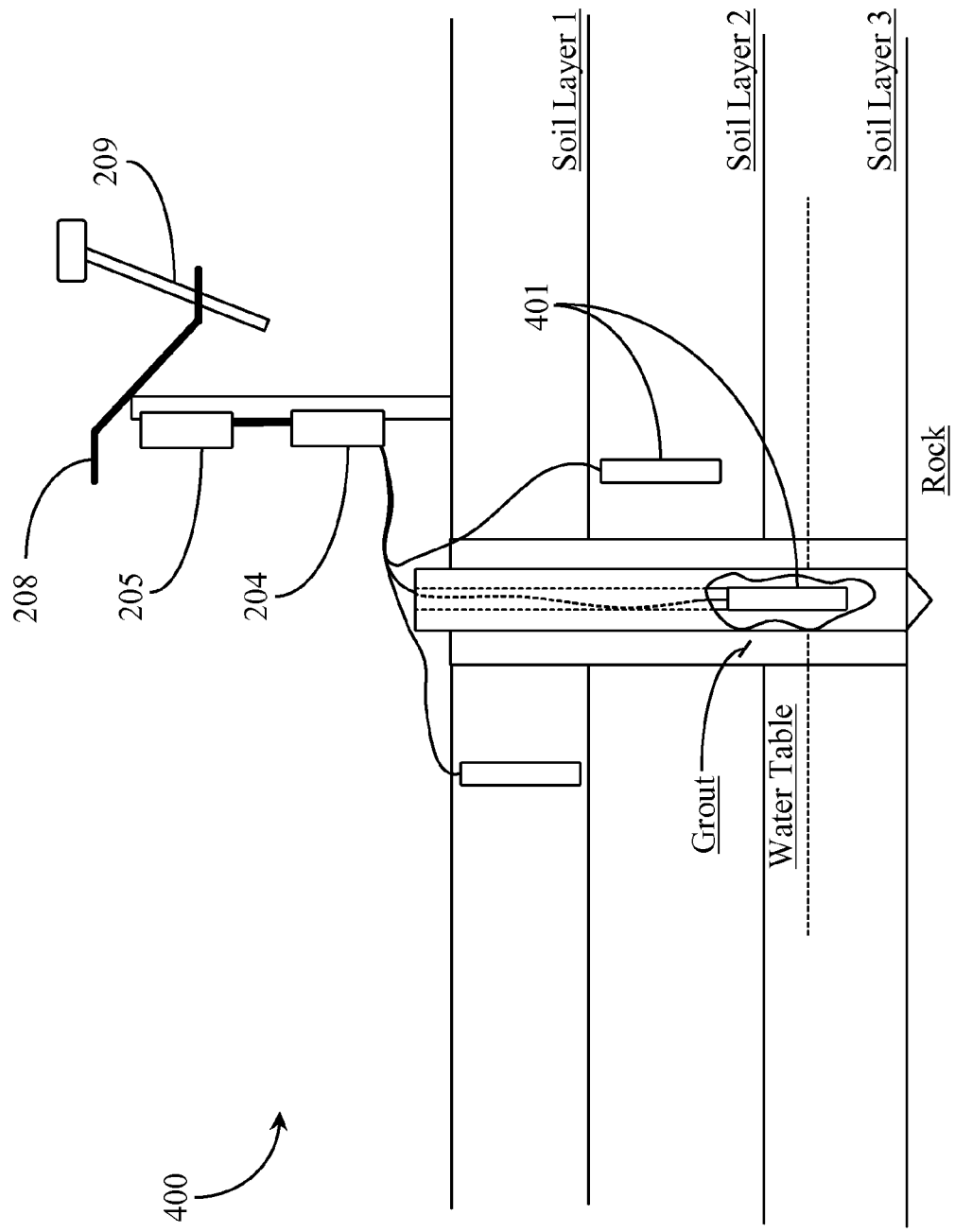
FIG. 4 is an elevation view of a wireless node and geological sensor deployment in a landslide prone area.

FIG. 4 is an elevation view of a wireless node 400 and geological sensor deployment in a landslide prone area. In this example, wireless node 400 includes a deep earth probe 402 that is carrying a tiltmeter 401. Tilt meters 401 are also deployed in the soil layers above the water table. Multiple tiltmeters are deployed to measure the angle of tilt experienced by the soil layers during the pre-initiation or at initiation of a landslide event. The soil layer movements are mostly initiated above the impermeable soil layer. The tiltmeter sensors are deployed in the impermeable layers and the permeable layer or layers above the impermeable layer to measure the angle of deformation experienced in the impermeable layer and the layers above it.

In this example, a tiltmeter 401 is fixed inside a DEP. Only part of the sensor tube will move as the slope slowly deforms because of the DEP's length and due to the fact that the DEP is anchored in the solid weathered rock or bedrock below the soil. This will cause part of the tube to become bent. The tiltmeter measures this bend in the tube. Trigonometric formulas may then be applied in raw data analysis to determine the amount of movement of the slope that has occurred. The sensor tube movement is very slight. Ground velocities in the range of millimeters per hour are detected. Wireless node 400 includes wireless transceiver 204, charging unit 205, solar panel 208 and antennae 209.

In a preferred embodiment all 6 sensor types comprising both geologic and hydrologic sensors described thus far in this specification are deployed in a same bore hole by a set of appropriate deep earth probes. The hydrologic sensors represent the first line of sensors monitored for data followed by the geologic sensors if thresholds associated with the hydrologic sensors are breached.

Frequency of Measuring Each of the Sensors (In One DEP)

Specific optimizations are implemented in the data collection network in order to reduce redundancy in data collection and to optimize energy use by the network. One example of redundant data might be data collected at times of low landslide risk where little or no rain is falling and sensor data is largely static or unchanging. During this time, the sampling rate of the sensors may be significantly reduced. Likewise, hydrologic sensors are powered on and monitored first until there is a requirement for powering up and monitoring geologic sensors. At heavy rainfall periods, sensor values will change more rapidly. Therefore, data has to be collected at a much higher frequency. Two basic approaches or methodologies are provided to address these issues.

Threshold Based Temporal Data Collection

One approach provided is to continuously monitor all of the deployed sensors in constant periodic intervals. In this embodiment, the frequency of sensor monitoring changes with environmental conditions on the ground. The frequency of measurement increases when the rainfall rate increases. In a variation of this aspect, a tri-level threshold approach is practiced. The levels correlate to low, medium, and high rainfall thresholds. When the threshold rate of rainfall (measured by rain gauges) crosses a low threshold the frequency of sensor measurement will increase proportionately. As long as the rainfall rate continues to be in the same range of measurement, the frequency of sensor sampling and measurement will not change. This approach is threshold based temporal data collection and aggregation technique. The frequency of sensor data collection increases with each level breached by the rainfall amount as measured by the rain gauges. It is noted herein that at some point in this process all of the sensors may be powered on and data collection might be continuous at critical rainfall levels.

The rain gauge reading of the rate and duration of rainfall determines the alert level of the network in this example and if a transition from one alert level to another is required. The network remains in a low level of alert if the deployment site receives zero to X mm of rain. This amount might be averaged over the number of rain gauges deployed in the field. If rainfall amounts increase to a level above the first pre-determined threshold, the network will transition to medium alert. The exact threshold amounts (X) may be adjusted depending on historic rainfall patterns. The network will transition from medium to high alert, if the rainfall rate increases above the next pre-determined threshold level. Pre-determined rainfall rate thresholds will be modified after analyzing the experimental test results received from the landslide laboratory set up for various climatic conditions. The aggregation technique used in this embodiment is to average the sensor values and transmitting them when the new data overshoots the pre-determined threshold value for each of two or more alert states. In this case the data between disparate sensors are not aggregated together. The data aggregation technique for each sensor is performed separately.

Sensor Triggered Measurement Initiation:

In this embodiment specific ones of the deployed sensors with a wireless node are powered on and monitored first during low risk periods. In these periods only the rain gauges are on and collecting data. In one example, the rain gauges, dielectric moisture sensors and piezometers are all powered on and are collecting data during low risk periods. Generally speaking, the hierarchy might be rain gauges first, then moisture sensors, and then piezometers. When the data received from the piezometer sensors cross the low threshold (averaged across the sensors) it will initiate data collection from the strain gauges, tilt meters, and geophones, which all detect earth movement. The data collection all the sensors will continue, once the moisture sensor becomes saturated. The frequency of measurement may also be increased. In the same manner once the piezometers are saturated, the frequency of the sensor measurement will be increased up to continuous measurement if required. This will reduce the energy consumption by only employing and collecting data from the sensors that are then required. It might be noted that rain gauges are always working in the system. The aggregation technique used in the DEP that has adopted sensor triggered measurement initiation technique has aggregated related sensors to derive the correlation between their sensor data. These data will be forwarded to the higher layer sensor nodes. So the amount of data transmitted will be less and the processing time will be reduced.

Figure 5:
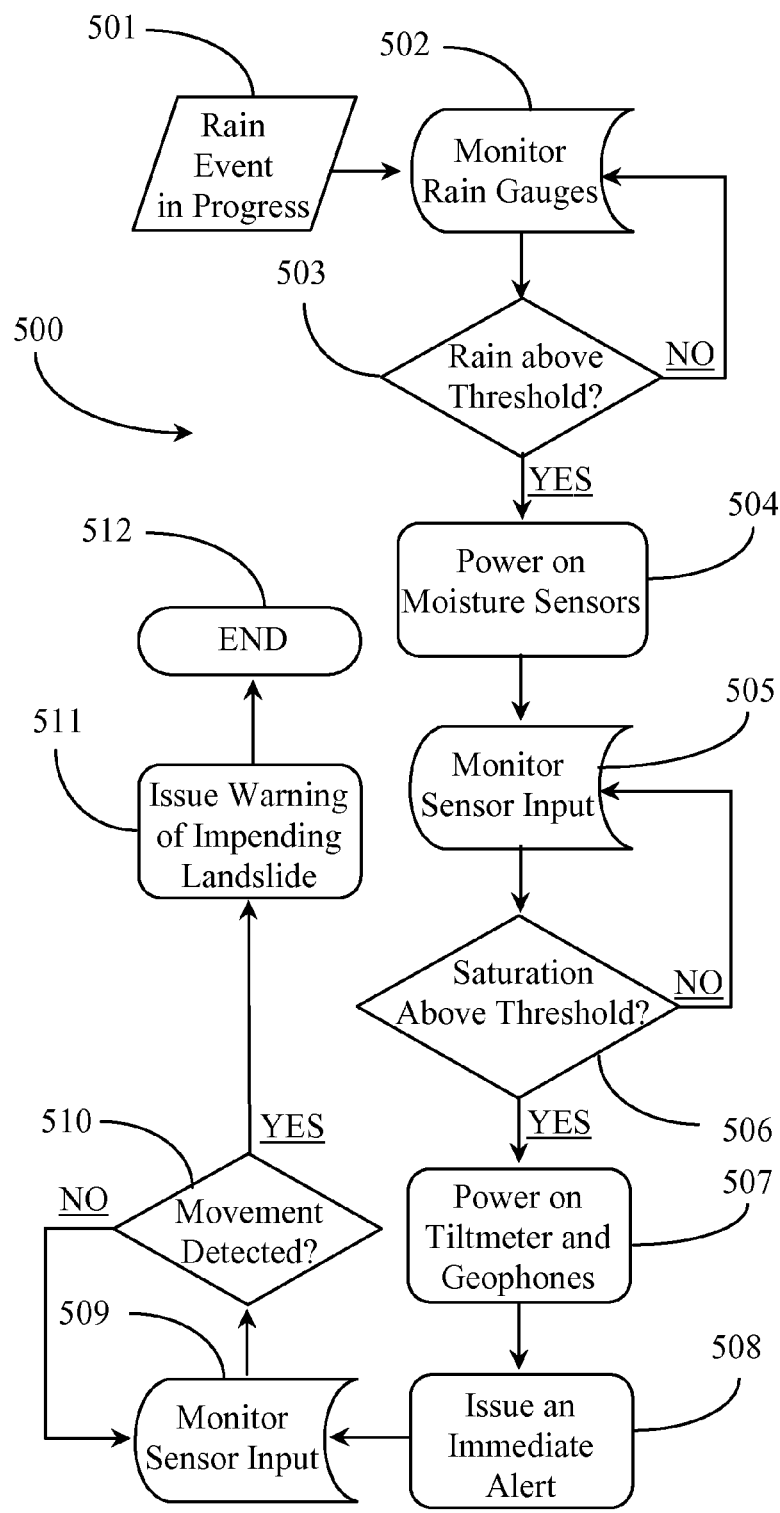
FIG. 5 is a process flow chart illustrating steps for monitoring for a landslide event and warning of an impending landslide according to an embodiment of the present invention.

FIG. 5 is a process flow chart 500 illustrating steps for monitoring for a landslide event and warning of an impending landslide according to an embodiment of the present invention. At step 501 a rain event is in progress in one or more deployment fields. At step 502, the system monitors rain gauges. The frequency of monitoring may change based on changes in amounts of rain collected or by rates of rainfall measured by the gauges. In this example, it is assumed that the method used is the sensor-triggered method previously described.

At step 503, the system determines if rainfall is measured above a pre-set threshold for a low level alert. It is noted in this example that the system id first monitoring the rain gauges and not necessarily the other hydrologic sensors. In this way as long as rainfall amounts are low there is no real need to take measurements from dielectric moisture sensors or the piezometers.

At step 503, if it is determined that rainfall is not above the first preset threshold, the process resolves back to step 502. However, if at step 503 it is determined that rainfall is above the lowest preset threshold for total rainfall amount or rate of rainfall measured per hour, then the system powers on the dielectric moisture sensors at step 504. At step 505, both rain gauges and moisture sensors deployed in the various soil layers above and below the water table are monitored. The frequency of monitoring may be increased depending on rainfall amount of the rain gauges. It is noted herein that the moisture sensors include both dielectric moisture sensors for measuring moisture levels in the soil and piezometers for measuring water pressure in the borehole both above and below the water table.

At step 506 the system determines if a second threshold for saturation of the moisture sensors is breached relative to average saturation level of the sensors or readings from selected sensors. In one aspect, the saturation levels of all of the moisture sensors are averaged relative to a saturation threshold for all of the soil layers and within the borehole. In another aspect the sensor data is aggregated separately and any breach of the threshold by any of the sensors is sufficient to raise the alert level. In still another aspect the dielectric sensors are monitored followed by steps for powering on and monitoring of the piezometers if the threshold for dielectric sensors in the soil levels above the water table are breached. In this case another threshold would be established for the one or more piezometers.

At step 506 if it is determined that the saturation level of the moisture sensors is not above the preset threshold, the process resolves back to step 505. If at step 506 the saturation level is above the preset threshold, the system powers on the geologic sensors deployed with the wireless node and deep earth probes at step 507. At this point the alert level is raised and the monitoring frequency may be increased. Also at this point the rain gauges may be monitored still even though they may be all above the preset level for rain gauges and the readings may become static until rainfall rates decline.

At step 508, the system issues an immediate alert to the affected community utilizing a variety of notification services such as email SMS, MMS, and telephony-based alerts to government officials and affected persons living and/or working in the path of an impending landslide. The alert issued at step 508 may be a watch or warning with additional instruction to stay tuned for a warning that may be issued later.

At step 509 the system monitors the geologic sensors including geophones, strain gauges, and tiltmeters in order to detect actual movement of earth associated with an active landslide event. The severity of an impending slide may also be predicted based on preliminary detection of movement by any of the above-mentioned sensors. At step 510 the system determines if earth movement is detected by any of the geologic sensors. It is assumed at this point that all of the hydrologic sensors are saturated and static in terms of readings.

If at step 510, the system determines that no earth movement is detected, the process resolves back to step 509. If the system detects earth movement at step 510, the system immediately issues a warning of an impending landslide at step 511. This warning is of a landslide in progress as detected by earth movement. The amount of earth movement detected or the rate at which movement is detected measured at the granularity of millimeters may help to classify the severity of the event and may help to predict possible outcomes relative to preliminary damage level predictions. An evacuation order may accompany the warning when it is issued. At step 512 the process ends with respect to notification. However, monitoring continues until the threat subsides in the event that a slide does not materialize. By utilizing this multi-tiered alert process, persons in the path of the impending landslide will have much more time to evacuate to a safe location than would otherwise be the case. At the same time, less power is consumed by the system and the alert data is more accurate and less redundant.

It will be apparent to one with skill in the art that the landslide prediction system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A wireless node for monitoring landslide conditions comprising:
    at least one tubular probe body deployed in a borehole in a landslide prone area and anchored to rock below soil;
    multiple sensors carried by and deployed within and outside of the tubular probe body for measuring hydrologic saturation and pressure at three or more distinct levels of soil above the rock, including at least moisture sensors embedded in soil walls of the borehole at each one of the levels for detecting soil saturation;
    a power source;
    a data acquisition board in communication with all of the sensors; and
    a wireless transceiver in communication with the data acquisition board and accessible to a local area wireless network (LAWN), which is in turn accessible to a wide area wireless network (WAWN);
    wherein geologic and hydrologic data, including at least soil saturation, of at least the three separate layers of soil above the anchor rock is collected in real time from the sensors at each soil layer, the data qualified against separate threshold readings set for each of the layers, and alerts are provided at three or more stages, graduating levels of alerts as a threshold at each layer is met culminating in a warning of an impending landslide.

2. The wireless node of claim 1, wherein the multiple sensors include but are not limited to piezometers, moisture sensors, strain gauges, and tilt meters.

3. The wireless node of claim 1, wherein individual ones of the multiple sensors are placed in the soil layers at, above and below the normal water table.

4. The wireless node of claim 1, further including access to data from at least one rain gauge.

5. The wireless node of claim 4, further including access to data from at least one geophone.

6. The wireless node of claim 1, wherein the borehole is back-filled with grout after one or more probes are deployed within.

7. The wireless node of claim 4, wherein the rain gauge or gauges have a threshold of an amount of rain associated therewith and breaching thereof causes the sensors deployed by the tubular probe body to begin sensing data at a first informal level of alert.

8. The wireless node of claim 1, wherein there is more than one tubular probe body per borehole and wherein the tubular probe bodies include bodies of differing diameters that deploy different sensor types.

9. The wireless node of claim 1, further including a solar panel for re-charging batteries.

10. A method for monitoring conditions for a landslide, comprising the steps of:
    (a) monitoring moisture readings received from moisture sensors embedded at three separate soil layers during heavy rainfall until a saturation threshold is reached in at least one layer;
    (b) issuing a level one alert to a web server connected to a network, the alert data propagated from the server to a research group monitoring the rainfall event;
    (c) monitoring pore water pressure values in each of the soil layers until a saturation threshold is reached in at least one of the layers;
    (d) issuing a level two alert to the web server, the alert data combined with other information and distributed to the affected community and government officials as a landslide watch;
    (e) monitoring for movement of soil in the soil layers during the high pore pressure event until soil movement is detected; and
    (f) issuing a level three alert to the web server, the alert data combined with other information and distributed to the affected community and government officials as a landslide in progress.

11. The method of claim 10 wherein the multiple sensors include but are not limited to piezometers, moisture sensors, geophones, strain gauges, and tilt meters.

12. The method of claim 10, wherein individual ones of the multiple sensors are placed in the soil layers at, above, and below the normal water table.

13. The method of claim 10, wherein there is more than one tubular probe body per borehole and wherein the tubular probe bodies include bodies of differing diameters that deploy different sensor types.

14. The method of claim 10, wherein in steps (d) and (f), alerts may be propagated using email, short message services (SMS), television broadcast, radio broadcast, and web page notifications.

15. The method of claim 10, wherein in step (a) only rain gauges and geophones are monitored.

16. The method of claim 10, wherein in step (c), rain gauges, geophones, moisture sensors, and piezometers are monitored with readings performed at a higher frequency.

17. The method of claim 10, wherein in step (c), rain gauges, geophones, moisture sensors, piezometers, tilt meters, and strain gauges are monitored with readings taken at a higher frequency when the threshold is reached.

18. The method of claim 10, wherein the network includes a local wireless fidelity (WiFi) network with access to a local area wireless network (LAWN) with access to a wide area wireless network (WAWN).

19. The method of claim 11, wherein the tilt meters are installed in soil and in the center of one or more of the tubular probe bodies.

20. The method of claim 19, wherein the tilt meter installed in the center of a tubular probe body measures an amount of bend in the tubing forming the body.

* * * * *